C. N. THOMAS.
Button Machinery.
No. 218,338. Patented Aug. 5, 1879.
Fig. 1.
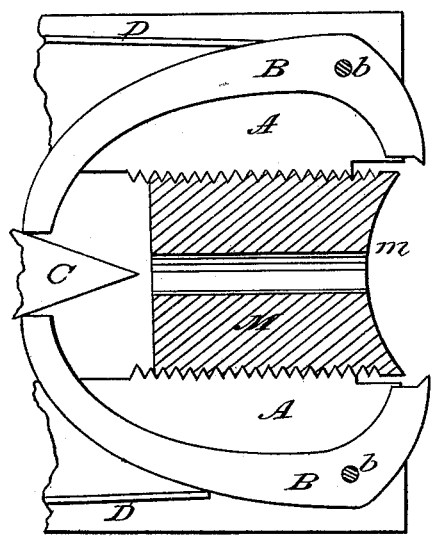
Fig. 2.
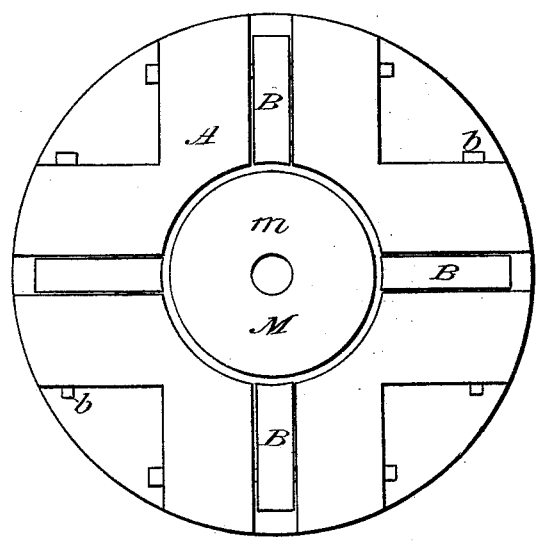
Fig. 3. Fig. 4. Fig. 5. Fig. 6.
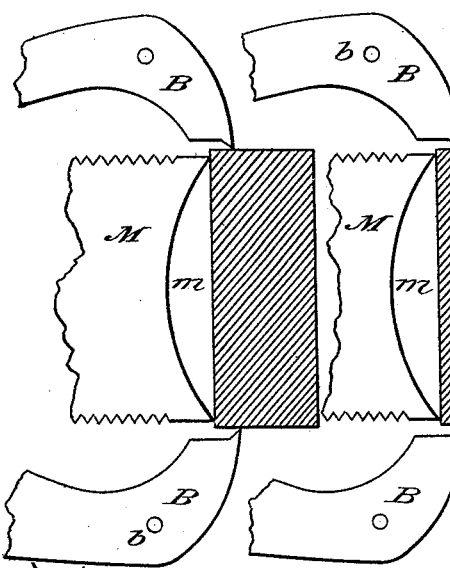 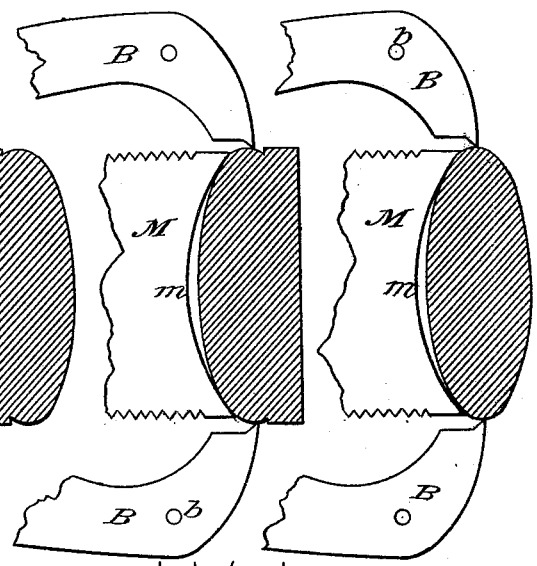
WITNESSES:
Charles C. Stetson
E. B. Colton
INVENTOR:
Charles N. Thomas
by his attorney
Thomas D. Stetson

UNITED STATES PATENT OFFICE.

CHARLES N. THOMAS, OF LEOMINSTER, MASSACHUSETTS, ASSIGNOR TO JOSEPH P. LOCKEY AND THOMAS J. ROCKWOOD, OF SAME PLACE.

IMPROVEMENT IN BUTTON MACHINERY.

Specification forming part of Letters Patent No. 218,338, dated August 5, 1879; application filed March 14, 1879.

*To all whom it may concern:*

Be it known that I, CHARLES N. THOMAS, of Leominster, Worcester county, in the State of Massachusetts, have invented certain new and useful Improvements relating to Button Machinery; and I do hereby declare that the following is a full and exact description thereof.

The invention pertains to the chuck in which the button-blank is held and rotated in being turned to the form required.

I have experimented with horn as a material for the button; but other materials, as bone, hard wood, or even metal, may be used. I have experimented on two-hole buttons; but four-hole, or even shank-buttons, may be made.

There is a form of button much in demand having both faces swelled. In some patterns both faces are swelled alike. In others one is swelled much more than the other. In all the rim is smooth, and it is important to be able to hold the button-blank by means of the rim in turning the second face.

The button-blanks are first prepared as disks of the proper thickness, with an approximately circular periphery, and both faces plane. The diameter should be a little larger than the button is to be, but it is not necessary to be much in excess, and the same with regard to thickness.

I use a self-centering chuck, in which four or other convenient number of arms or jaws are pinched together by suitable mechanism connected with the chuck, and seize the blank by its periphery. The center or surface of the chuck between the jaws is concave. I prefer that it be a little more concave than the greatest amount of swell which is required on the button. On first introducing a blank the jaws are opened wide, and the blank pressed backward until its plane face touches the center around the rim. This holds it well outward, and the jaws on being drawn together seize it firmly; but as they take only a short hold, they leave a great portion of the thickness of the blank projecting beyond the ends of the arms. Thus held, I apply a suitable tool, either by hand or machinery, and give the proper contour to all that part which extends out beyond the ends of the arms—that is to say, I give the proper swell to the outer face, and turn up a completely-finished rim, or greatest diameter of the finished button, and I carry the tool over a little beyond the rim onto the back side; but, obviously, I can carry that but a little way before my tool will be liable to come in contact with the ends of the jaws. Then I open the jaws, drop the button, and, turning it around, press it back again into the jaws. This time it goes in much farther. The hollowed center allows the bellied side, which has been previously prepared, to sink deeply into it. This sinks so far that the jaws, which previously engaged only a little way on the periphery, now take hold of the previously-finished rim and hold it firmly. Thus conditioned, I turn the remaining surface, giving the proper belly to the face which is now presented outside. This may have the same amount of swell as before, or less or more; but in all cases economy of material requires that the blank shall, in the first place, be only a little greater thickness than is required for the finished button.

When the sides are swelled unequally, the side which is most swelled can be produced first or last by properly adjusting the parts.

In order to produce buttons of different thickness and with different degrees of swell, it is desirable to shift my hollow center inward and outward at pleasure. To this end I make the hollow face in a piece of metal set into the main chuck and adjustable therein. The adjustment may be made by various mechanical devices. I prefer a screw-thread formed on the exterior of the center-piece, and tapped into a corresponding female thread made in the chuck; but this precise construction is not essential. I can attain a sufficiently nice adjustment with little labor by the use of a plain cylindrical center and pinching-screw.

The accompanying drawings form a part of this specification, and represent what I consider the best means of carrying out the invention.

Figure 1 is a central longitudinal section through the chuck, and Fig. 2 a face view.

The additional figures are diagrams, showing only the button-blank and the parts immediately adjacent thereto. All are central longitudinal sections.

Fig. 3 shows the blank just applied and grasped in the chuck. Its plane face lies across the concavity in my hollow center. Fig. 4 shows the same after a little more than half the surface has been finished while thus held. Fig. 5 shows the blank in the same form as in Fig. 4, but reversed. Now the rounded side of the partially-finished button applies into my hollow center, and allows the jaws to take hold farther, bearing on the finished edge of the button. Fig. 6 shows the same after the button has been finished by the turning of the remaining side.

Similar letters of reference indicate like parts in all the figures.

A is the main body of the chuck. It will be understood that this is attached by a screw-thread or other reliable means upon an arbor (not shown) which runs in bearings, and is equipped with means for rotating it rapidly and steadily.

B B are sharp or thin-ended jaws turning on centers $b$, and actuated by a cone, C, which is equipped with means (not represented) for shifting it axially in the arbor or chuck to strongly close the jaws. Springs D incline the jaws to open whenever the cone C is withdrawn.

My hollow or recess in the face of the chuck is marked $m$. It is formed in the end of an adjustable piece, M. I can make the diameter of this piece M larger or smaller within considerable limits, and can change the pieces M in any given chuck, substituting pieces with a smaller or larger hollow $m$, as may be required; but independently of such substitution, or additionally to such, I can set the center M outward or inward, at will, within wide limits. I prefer to effect this by simply turning the piece M, and having it screw-threaded on the periphery, and engaging in a corresponding thread in the interior of the chuck A. I can take hold of the center M for this purpose by driving a suitable tapering squared piece of steel (not shown) into a small hole in the axial line of the center-piece M. This hole may be squared, if desired, in any case; but I have found no trouble in making it take hold with sufficient force in a plain round-drilled hole. To adjust it, I simply drive in a tapering piece, so as to get a firm hold of the center M, and then turn the center by its means, acting on it with any suitable lever or wrench.

My center is capable of being adjusted with great nicety. Its property of allowing the finished side of the button to sink into the chuck while the plane face is not so admitted allows the buttons to be produced with great rapidity, and the two faces to be finished in succession by the same operator and in the same lathe.

The concave may have a form approximating that of the finished face of the button which it is to receive; but it should be always deeper. This insures that the button will always bear near the periphery, and thus be held truly—that is to say, when the blank is first presented its plane face rests against the extreme rim or outer edge of my concave center M $m$. It is thus certain to be held truly; and when it is turned, and the nicely-bellied side of the button is applied inward against my center, it is still held by the periphery a little within the rim, so that on pressing it backward with the finger, when the jaws B by their closing action bring it positively into the central position, it is sure to lie not only in the central position, but also perfectly true—that is, without one side of the rim being held farther forward than another.

Modifications may be made in the proportions. I cannot only vary the means of adjusting the center backward and forward, but also the number of the seizing-jaws B. So also the diameter and other proportions of all the parts may be varied within wide limits.

The concavity may be varied from exactly equal to the belly of the button to a considerably greater degree of concavity; but it must never be less than the fullness of the button. It must never bear on the button at or near the center, so as to relieve it from bearing near its periphery. I prefer that the curvature of the concavity shall be greater near the periphery, so that the bearing shall be always at or very close to the extreme periphery, whatever may be the form of the button.

It is important that the button be turned a little more than half the thickness of the blank in the first holding in the lathe; but it is not absolutely essential that the tool be carried over, so as to begin to turn the back or the second face.

I can, if preferred, simply turn a considerable thickness cylindrical at the periphery, and on turning the blank around take so fine a hold of the periphery that the whole of the other face may be turned in the second holding.

The concave in the end of the center may be much deeper. It may be of great depth, so as to render the center a tube; but if arranged and operated as shown, such will serve with substantially the same effect.

I am aware of the patent of F. Kirst, dated July 12, 1864. My invention is different therefrom.

I claim as my invention—

1. The within-described lathe-chuck having the hollow center $m$, in combination with thin-ended self-centering jaws B, arranged substantially as described, whereby a blank or button, when grasped by said jaws, is sustained near its periphery by said center, as herein set forth.

2. The combination, with chuck A and thin-ended jaws B, of the adjustable hollow-ended center $m$, adapted for sustaining near its periphery a blank or button grasped by said jaws, and by means of its adjustment to regulate the point at which each jaw grasps the blank or button, substantially as described.

3. The lathe-chuck described, having the hollow-ended center $m$, in combination with the claw-ended holding-jaws B, when said center is adjustable directly in the chuck-head by mechanism substantially as described.

4. The screw-threaded chuck-head, the screw-threaded hollow-ended center, and the claw-ended holding-jaws, all in combination, substantially as shown.

In testimony whereof I have hereunto set my hand this 12th day of March, 1879, in the presence of two subscribing witnesses.

CHARLES N. THOMAS.

Witnesses:
JOSEPH P. LOCKEY,
H. A. JOHNSTONE.